United States Patent
Bukosky et al.

(10) Patent No.: US 7,104,676 B2
(45) Date of Patent: Sep. 12, 2006

(54) SIGNALING ASSEMBLY

(75) Inventors: Allen A. Bukosky, Sheboygan, WI (US); Daniel J. Mathieu, Sheboygan Falls, WI (US); Daniel R. Todd, Sheboygan, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 178 days.

(21) Appl. No.: 10/786,950

(22) Filed: Feb. 23, 2004

(65) Prior Publication Data

US 2004/0165398 A1 Aug. 26, 2004

Related U.S. Application Data (63) Continuation-in-part of application No. 10/124,213, filed on Apr. 15, 2002, now Pat. No. 6,918,685, and a continuation-in-part of application No. 10/283,715, filed on Oct. 29, 2002, now Pat. No. 6,749,325.

(51) Int. Cl.
*B60Q 1/26* (2006.01)
*B60Q 1/24* (2006.01)

(52) U.S. Cl. .............. 362/494; 362/544; 362/135; 362/540

(58) Field of Classification Search .......... 362/494, 362/544, 545, 135, 136, 492, 540, 235, 800, 362/341, 241, 245, 300, 301; 340/475; 359/606
See application file for complete search history.

(56) References Cited

U.S. PATENT DOCUMENTS

| | | | |
|---|---|---|---|
| 2,580,014 A | 12/1951 | Gazda | 362/494 |
| 2,595,331 A | 5/1952 | Calihan et al. | 362/494 |
| 3,266,016 A | 8/1966 | Maruyama et al. | 362/494 |
| 4,583,155 A | 4/1986 | Hart | 362/285 |
| 4,646,210 A | 2/1987 | Skogler et al. | 362/142 |
| 4,791,534 A | 12/1988 | Lindberg | 362/516 |
| 4,821,019 A | 4/1989 | Taylor | 362/494 |
| 4,882,565 A | 11/1989 | Gallmeyer | 340/461 |
| 5,014,167 A | 5/1991 | Roberts | 362/494 |
| 5,059,015 A | 10/1991 | Tran | 359/846 |
| 5,207,492 A | 5/1993 | Roberts | 362/30 |
| 5,303,130 A | 4/1994 | Wei et al. | 362/494 |
| 5,355,284 A | 10/1994 | Roberts | 362/30 |
| 5,361,190 A | 11/1994 | Roberts et al. | 362/464 |
| 5,371,659 A | 12/1994 | Pastrick et al. | 362/494 |
| 5,402,103 A | 3/1995 | Tashiro | 340/475 |

(Continued)

FOREIGN PATENT DOCUMENTS

GB 268.359 7/1927

(Continued)

OTHER PUBLICATIONS

U.S. Appl. No. 10/124,213, filed Apr. 15, 2002, Bukosky et al.

(Continued)

*Primary Examiner*—Sandra O'Shea
*Assistant Examiner*—Bao Q. Truong
(74) *Attorney, Agent, or Firm*—Wells St. John P.S.

(57) ABSTRACT

A signaling assembly is disclosed and which includes a reflective substrate having opposite first and second surfaces; an electromagnetic radiation emitter for emitting visibly discernible electromagnetic radiation and which is borne by the second surface of the reflective substrate; and a light channeling assembly positioned near the electromagnetic radiation emitter, and which directs the emitted visibly discernible electromagnetic radiation in a direction where it may be viewed from a location which is forward of one of the first and/or second surfaces of the reflective substrate.

29 Claims, 7 Drawing Sheets

U.S. PATENT DOCUMENTS

| | | | | |
|---|---|---|---|---|
| 5,436,741 | A | 7/1995 | Crandall | 359/15 |
| 5,481,409 | A | 1/1996 | Roberts | 359/839 |
| 5,497,305 | A | 3/1996 | Pastrick et al. | 362/494 |
| 5,499,169 | A | 3/1996 | Chen | 362/494 |
| 5,528,422 | A | 6/1996 | Roberts | 359/583 |
| 5,634,709 | A | 6/1997 | Iwama | 297/229 |
| 5,788,357 | A | 8/1998 | Muth et al. | 362/494 |
| 5,892,438 | A | 4/1999 | Vaughn | 340/468 |
| 5,984,496 | A | 11/1999 | Malcomson | 362/494 |
| 6,005,724 | A | 12/1999 | Todd | 359/884 |
| 6,045,243 | A | 4/2000 | Muth et al. | 362/494 |
| 6,076,948 | A * | 6/2000 | Bukosky et al. | 362/494 |
| 6,142,656 | A | 11/2000 | Kurth | 362/494 |
| 6,257,746 | B1 | 7/2001 | Todd et al. | 362/494 |
| 6,264,353 | B1 | 7/2001 | Caraher et al. | 362/494 |
| 6,276,821 | B1 | 8/2001 | Pastrick et al. | 362/494 |
| 6,355,920 | B1 | 3/2002 | Schofield et al. | 250/206 |
| 6,585,399 | B1 | 7/2003 | Kreutzer et al. | 362/341 |
| 6,637,917 | B1 | 10/2003 | Schwanz et al. | 362/487 |
| 6,644,838 | B1 | 11/2003 | Stidham et al. | 362/494 |
| 6,685,325 | B1 | 2/2004 | Hulse et al. | 362/494 |
| 6,685,348 | B1 | 2/2004 | Pastrick et al. | 359/879 |
| 6,926,432 | B1 * | 8/2005 | Rodriguez Barros et al. | 362/494 |
| 6,945,672 | B1 * | 9/2005 | Du et al. | 362/545 |

FOREIGN PATENT DOCUMENTS

| | | |
|---|---|---|
| GB | 1172382 | 11/1969 |

OTHER PUBLICATIONS

U.S. Appl. No. 10/283,715, filed Oct. 29, 2002, Bukosky et al.
U.S. Appl. No. 10/355,915, filed Jan. 28, 2003, Todd et al.
US 4,918,430, 04/1990, Vu et al. (withdrawn)

* cited by examiner

SIGNALING ASSEMBLY

CROSS-REFERENCE TO RELATED APPLICATIONS

The present application is a Continuation-in-Part of U.S. patent application Ser. No. 10/124,213, filed on Apr. 15, 2002 now U.S. Pat. No. 6,918,685, and application Ser. No. 10/283,715, filed on Oct. 29, 2002 now U.S. Pat No. 6,749,325.

TECHNICAL FIELD

The present invention relates to a signaling assembly which finds usefulness when installed on overland vehicles, and more particularly to a signaling assembly which, when coupled with the controls of an overland vehicle, may operate as a combined warning lamp and rear view mirror assembly, and which further provides a visibly discernible signal which can be viewed from a wide range of locations not possible heretofore.

BACKGROUND OF THE INVENTION

The beneficial effects of employing auxiliary signaling assemblies have been disclosed in various United States Patents including U.S. Pat. Nos. 5,014,167; 5,207,492; 5,355,284; 5,361,190; 5,481,409; 5,499,169; 5,528,422; 6,005,724; and 6,257,746, as well as U.S. patent application Ser. Nos. 10/124,213 and 10/283,715 all of which are incorporated by reference herein. The mirror assemblies disclosed in some of these patents teach the use of various dichroic mirrors which are operable to reflect a broad band electromagnetic radiation, within the visible light portion of the spectrum, while simultaneously permitting electromagnetic radiation having wavelengths which reside within a predetermined spectral band to pass therethrough. As disclosed in this earlier prior art, these same dichroic mirrors remain an excellent visual image reflector, that is, achieving luminous reflectance which is acceptable for automotive, and other industrial applications, while simultaneously achieving an average transmittance in the predetermined spectral band which is suitable for use as a visual signal at a wide range of distances and for various purposes.

While all of these prior art devices have worked with some degree of success, various shortcomings have been uncovered which have detracted from their wide spread use. Among the several shortcomings which have impeded commercial introduction has been the manufacturing costs associated with applying the rather complex optical coatings which are necessary to form the dichroic mirrors that are employed in these several devices.

Still further, other mirror products have been introduced which diverge, to some degree, from the use of dichroic mirrors. These devices however, when built in accordance with their teachings, have been unable to provide the same performance characteristics as provided by the prior art which employs dichroic mirrors. Still further, other prior art references have described devices which attempt to provide the same functional benefits as described in these earlier patents. These references describe all manner of mirror housing modifications, where for example, lamps are located in various orientations to project light into predetermined areas both internally and/or beside the overland vehicle and to further provide auxiliary signaling or warning capability. Examples of these patents include U.S. Pat. Nos. 4,583,155; 4,646,210; 4,916,430; 5,059,015; 5,303,130; 5,371,659; 5,402,103; 5,497,306; and 5,436,741 to name but a few.

In addition to the shortcomings associated with fabricating a suitable dichroic coating for use in mirror assemblies as described in the prior art, the extensive modifications required by some designs as described in the before mentioned patents typically allow significant amounts of ambient light to enter the housing or lamp enclosure thereby reducing the perceived contrast level and thus the effectiveness of these signaling devices. Further, federal regulations also restrict the distance a mirror housing can protrude from the side of an overland vehicle, thus the associated mirror housings have limited volume. Consequently, the amount of internal space which is normally available when these same housings are employed is quite limited. Therefore, the size, weight, and perceived contrast level of an enclosed light emitting assembly employed in such signaling devices have become significant factors in the development and commercial introduction of a suitable product.

To address these and other perceived shortcomings in the prior art, U.S. Pat. No. 6,005,724 disclosed a novel mirror assembly which employed a mirror substrate which is fabricated by using conventional techniques, and which includes a primary mirror surface region which reflects less than about 80% of a given band of visibly discernable electromagnetic radiation; and a secondary region adjacent thereto and through which electromagnetic radiation may pass. In mirrors of this design, the average reflection of the mirror coating is greater than about 50%. This novel invention resulted in significant decreases in the manufacturing costs for devices of this type. Still further, the perceived safety advantages of using such auxiliary signaling devices has now been well established, inasmuch as these same signaling assemblies provide a convenient means whereby an operator may signal vehicles which are adjacent to, and rearwardly oriented relative to an overland vehicle equipped with same, of their intention, for example, to change lanes, turn, or perform other vehicle maneuvers which would be of interest to vehicles traveling adjacent thereto.

A signaling assembly which achieves these and other advantages is the subject matter of the present application.

SUMMARY OF THE INVENTION

Therefore, one aspect of the present invention relates to a signaling assembly which includes a reflective substrate having opposite first and second surfaces; an electromagnetic radiation emitter for emitting visibly discernible electromagnetic radiation and which is borne by the second surface of the reflective substrate; and a light channeling assembly positioned near the electromagnetic radiation emitter, and which directs the emitted visibly discernible electromagnetic radiation in a direction where it may be viewed from a location which is forward of one of the first and/or second surfaces of the reflective substrate.

Another aspect of the present invention relates to a signaling assembly which includes a housing having a sidewall and which defines an internal cavity, and first and second apertures; a reflective substrate having opposite, first and second surfaces, and a peripheral edge, and which further partially occludes the first aperture that is defined by the housing, and wherein a gap is defined between the reflective substrate, and the sidewall; a translucent substrate disposed in substantially occluding relation relative to the second aperture; an electromagnetic radiation emitter mounted on the second surface of the reflective substrate and which, when energized, emits visibly discernible electromagnetic radiation having first and second portions, and wherein the second portion of the visibly discernible electromagnetic radiation passes through the translucent substrate; and a light channeling assembly disposed, at least in part, against the sidewall of the housing, and which reflects the first portion of the visibly discernible electromagnetic radiation through the gap which is defined between the sidewall and the reflective substrate.

Another aspect of the present invention relates to a signaling assembly which includes a housing having a sidewall defining an internal cavity, and first and second apertures; a reflective substrate having a peripheral edge, and which is disposed in substantially occluding relation relative to the first aperture; and an electromagnetic radiation emitter borne by the reflective substrate and emitting visibly discernible electromagnetic radiation into the cavity, and wherein a first portion of the visibly discernible electromagnetic radiation passes around the peripheral edge of the reflective substrate and forms a first visibly discernible signal which can be seen from a first position; and a second portion of the visibly discernible electromagnetic radiation passes through the second aperture and forms a second visibly discernible signal which can be seen from a second location, and wherein the first and second locations are angularly displaced one relative to the other by greater than about 90 degrees.

Yet another aspect of the present invention relates to a signaling assembly which includes a mirror housing having a sidewall defining an internal cavity, and first and second apertures; a reflective substrate having a peripheral edge, and which is disposed in partially occluding relation relative to the first aperture; an electromagnetic radiation emitter borne by the reflective substrate, and located within the internal cavity of the housing, and which, when energized, emits visibly discernible electromagnetic radiation which passes through the second aperture, and which can be visibly discerned from a location, and at a distance from the mirror housing; and a light channeling assembly positioned in the internal cavity, and adjacent to the electromagnetic radiation emitter, and which directs visibly discernible electromagnetic radiation through the second aperture, and which further substantially impedes emitted visibly discernible electromagnetic radiation from passing around the peripheral edge of the mirror.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

First Form

Figure 3:
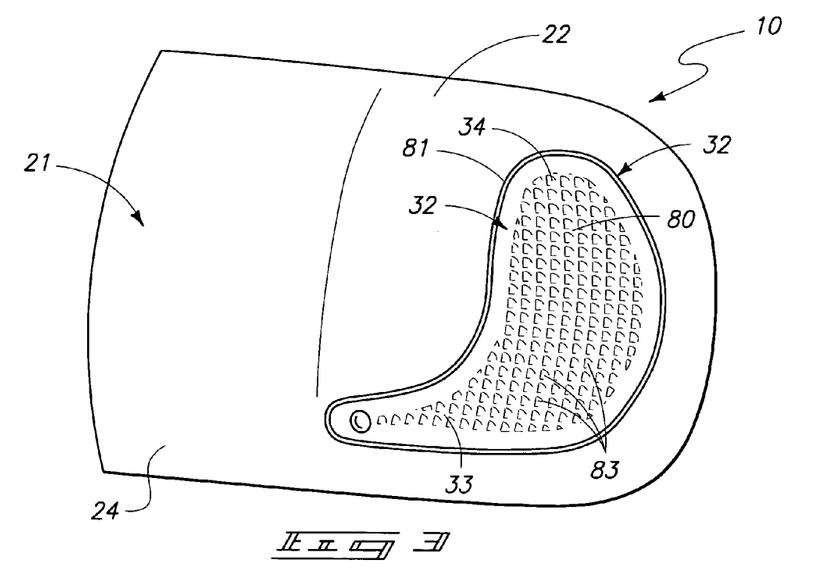
FIG. 3 is a perspective, side elevation view of one side of the signaling assembly of the present invention.
Figure 4:
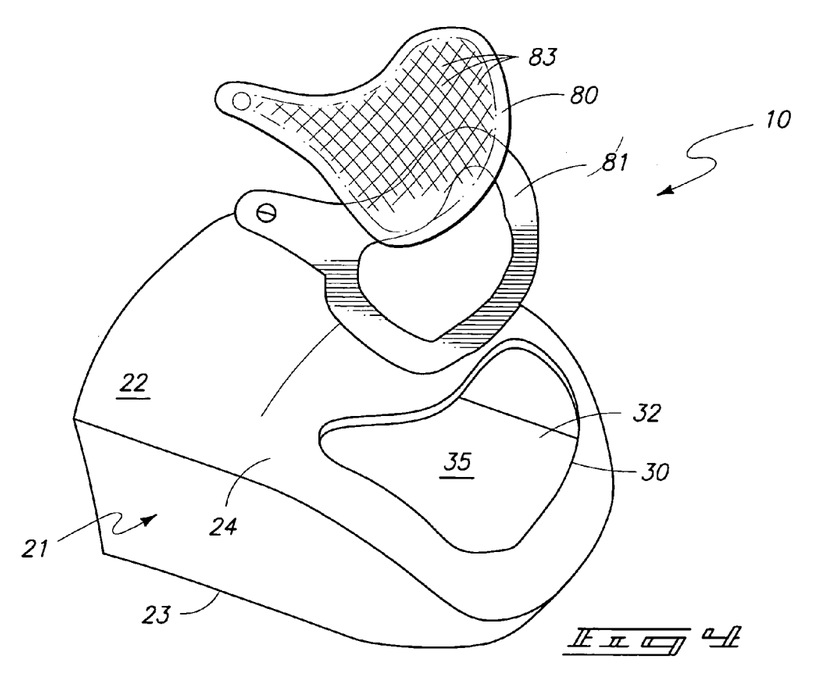
FIG. 4 is a partial, perspective, exploded view of the housing employed with the signaling assembly of the present invention.
Figure 5:
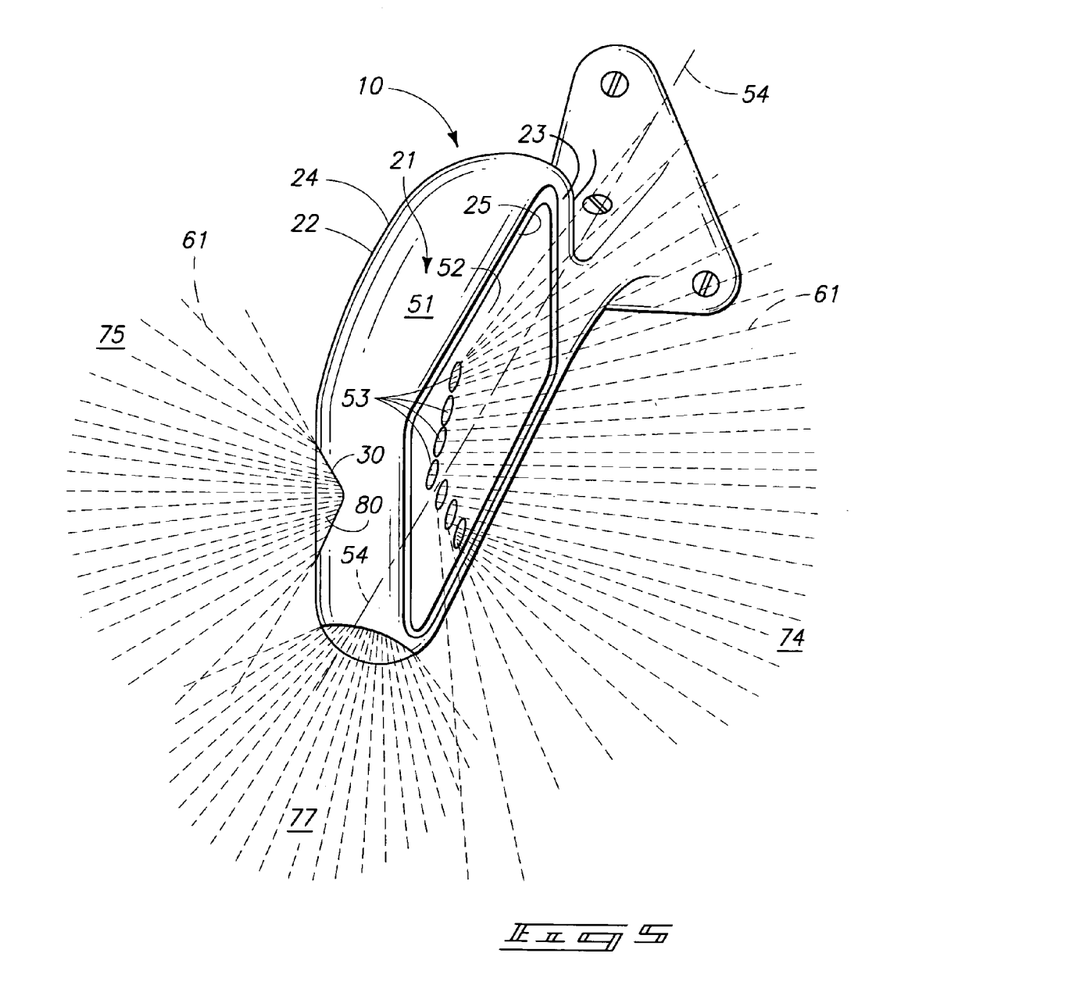
FIG. 5 is a perspective view of an energized signaling assembly of the present invention.
Figure 6:
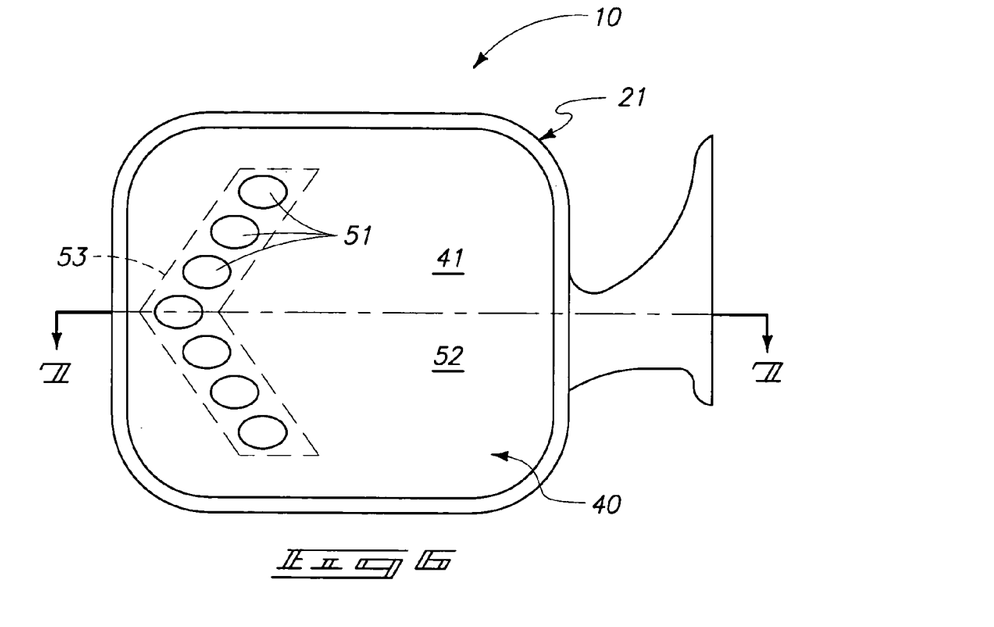
FIG. 6 is a second, side elevation view and which illustrates one side of a signaling assembly of the present invention.
Figure 7:
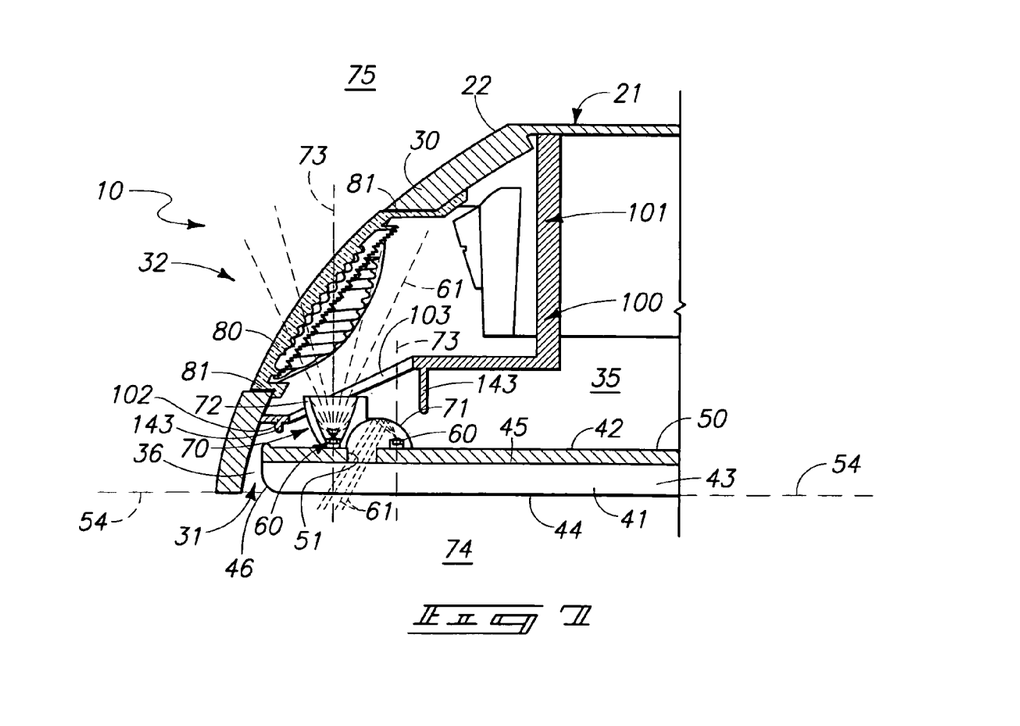
FIG. 7 is a fragmentary, transverse, vertical sectional view of a signaling assembly of the present invention, and which is taken from a position along line 7—7 of FIG. 6.

A first form of a signaling assembly which incorporates the teachings of the present invention is best seen by reference to the numeral 10 in FIGS. 1–7 respectively. As discussed above, the present invention finds usefulness when installed on an overland vehicle 11 of conventional design and which is best seen by reference to FIG. 1. As shown therein, the overland vehicle 11 has a forward, or front end 12; an opposite, or rear end 13; and an operator's position 14. From the operator's position 14, various signaling lamps indicated by the numeral 15 can be selectively energized in order to provide visual information to adjoining drivers regarding the intended directional movement of the overland vehicle 11 as it proceeds along a given course of travel. As seen more specifically by reference to FIG. 2, the apparatus 10 is mounted on or near the door 20 of the overland vehicle such that a portion, or one side of same (FIG. 6) can be viewed from the operators position 14 and from positions laterally and rearwardly of the overland vehicle 11. As seen more specifically in FIGS. 3 through 7, for example, the apparatus 10 includes a housing generally indicated by the numeral 21. The housing 21 is formed of an opaque, convexly curved sidewall 22, although other sidewall shapes will work with an equal amount of success. The convexly curved sidewall has a first side 23; and an opposite, second side designated by the numeral 24. As seen in FIG. 5, for example, the sidewall 22 is defined by a first peripheral edge 25, which is located on the first side 23 of the housing. Further, the convexly curved sidewall 22 has a second peripheral edge 30 (FIG. 4), which is located on the second side 24 of the housing 23. As illustrated, the first peripheral edge 25 is located in generally about the same plane, and defines a first aperture 31 (FIG. 7). Yet further, the second peripheral edge 30, defines a second aperture 32 which follows the curvature or shape of the sidewall 22. This aspect of the invention can be seen by references to FIGS. 4 and 5, for example. The second aperture 32 has first and second diverging portions 33 and 34 (FIG. 3). The housing 21 defines a cavity 35 (FIGS. 4 and 7) and which encloses various assemblies which will be discussed in greater detail hereinafter. A gap 36 (FIG. 7) is defined between the sidewall 22 and the reflective substrate, 40 which is discussed below.

As best seen by reference to FIG. 7, a reflective substrate or mirror 40 of substantially conventional design is received or otherwise supported in partially occluding relation relative to the first aperture 31 which is defined by the housing 21. The reflective substrate or mirror 40 has a first or outwardly facing surface 41 which faces away from the cavity 35, and a second or inwardly facing surface 42 which faces inwardly toward the cavity 35. As best understood by the greatly simplified and exaggerated view of FIG. 7, the reflective substrate or mirror 40 is fabricated from a light transmissible substrate 43 which has opposite first and second surfaces 44 and 45, respectively, and a peripheral edge 46.

A reflective layer which is generally indicated by the numeral 50, is positioned in at least partial covering relation relative to one of the first or second surfaces 44 or 45 of the light transmissible substrate. In later figures, this reflective surface has been eliminated so that other features of the invention may be more easily understood. It should be appreciated that each of the reflective substrates 40 as depicted in each of the figures would include a reflective layer of the type presently discussed. As should be understood, the location of the reflective layer on either one of these two surfaces will not meaningfully effect the operation of the present invention. As seen in FIG. 7, for example, the reflective coating or layer 50 is positioned on the second or inwardly facing surface 45. The reflective layer 50 provides a highly reflective surface which reflects ambient, visibly discernable electromagnetic radiation. The reflective layer 50 may comprise, for example, a layer of chromium which is deposited to a thickness which passes less than about 10% of ambient visible electromagnetic radiation. As seen in the drawings, a discrete aperture 51 may be formed in the layer of chromium and which permits the passage of electromagnetic radiation therethrough. The aperture 51 may be formed in various sizes and shapes in order to achieve the benefits as will be described hereinafter (FIGS. 6 and 7). In this arrangement, the reflective coating or layer 50 which passes less then about 10% of the visibly discernible electromagnetic radiation is considered to be a first region 52 (FIG. 6), and the discrete apertures 51, which are substantially devoid of any reflective coating and adjacent areas 53 are considered a second region. This secondary region is outlined by the use of phantom lines. The size and dispersion of the respective apertures 51 are done in a fashion such that the resulting reflective substrate including the first and second regions 52 and 53 is greater than about 30%. Still further, the reflective layer 50 may comprise a dichroic coating which is operable to pass a predetermined band of electromagnetic radiation. The dichroic coating may similarly be applied to one of the first or second surfaces 44 or 45. Assuming that a dichroic coating is utilized as the reflective layer 50, the requirement of forming or defining an aperture 51 is normally not necessary in view of the optical characteristics of the dichroic coating.

In an alternative embodiment, the reflective layer 50 which comprises chromium may be deposited to a given reduced thickness which permits the passage of increasing amounts of electromagnetic radiation therethrough. Such a reflective layer is typically referred to as "thin chrome." One skilled in the art is readily capable of calculating the thickness of the chromium which must be deposited in order to form a reflective layer 50 which passes the desired amounts of visibly discernable electromagnetic radiation. In yet still a further embodiment, the reflective layer 50 may be deposited on the light transmissible substrate in a manner to form two portions or regions, that is a first portion or region comprising chromium which is deposited to a thickness which passes less than about 10% of ambient visible electromagnetic radiation or no visibly discernable electromagnetic radiation at all, and a second portion or region having a thickness less than the first portion or region, and which passes visibly discernable electromagnetic radiation in an amount greater than about 10%. In this arrangement, the blemish, which would normally result in the mirror 40 and which is caused by the formation of the aperture 51 in the reflective layer 50 is substantially avoided, because the first surface 41 of the reflective substrate 40 would appear to a casual observer, at normal observation distances, as being substantially continuous. As was discussed above, the average reflectance of the first and second regions is greater than about 30%.

Regardless of the form of the reflective substrate 40 which is chosen to partially occlude the first aperture 31 of the housing 21, the reflective substrate is operable to simultaneously reflect visibly discernable electromagnetic radiation and pass visibly discernable electromagnetic radiation so that it may be viewed from substantially opposite locations relative to the housing 21, that is, from a location forward of or in spaced relation relative to the first surface 41, (that is rearwardly of the overland vehicle 11) and forward of, or in spaced relation relative to the second surface 42, (that is forwardly of the overland vehicle 11).

As seen in FIG. 6, for example, the reflective substrate 40 has a primary or first region 52 which reflects on average at least about 35% of all visibly discernable electromagnetic radiation; and passes less than about 10% of all visibly discernable electromagnetic radiation, and a second region 53 (shown in dashed lines in FIG. 6), and which passes greater than about 10% of the same visibly discernable electromagnetic radiation. As illustrated in the drawings, the secondary region 53 which is adjacent to the primary region 52 includes a plurality of apertures 51 that are disposed in a given pattern. The light emitting apertures 51, as earlier discussed, are formed in the secondary region 53 by partially or completely removing the reflective coating or layer 50 in a given pattern. As earlier discussed, the partial removal of the reflective coating may not result in an aperture as seen in the drawing, but rather a "thin chrome" or reduced thickness area which permits increasing amounts of visibly discernable electromagnetic radiation to pass therethrough. As seen in the drawings, and as discussed above, the secondary region may be continuous or discontinuous. The specific details of forming the primary and secondary regions 53 and 54 are set forth in greater detail in U.S. Pat. No. 6,005,724 the teachings of which are incorporated by reference herein. As seen in FIGS. 5 and 7, the first or forwardly facing surface 41 of the reflective substrate or mirror 40 defines a line of reference which is generally indicated by the numeral 54.

As seen most clearly by reference to FIG. 7, and following, a plurality of electromagnetic radiation emitters, here illustrated as a plurality of LEDs 60 are borne by the second surface 42 of the reflective substrate 40 and which, when energized, emits visibly discernable electromagnetic radiation which is indicated by the numeral 61. While the light emitting diodes are shown mounted on the second surface 42 of the reflective substrate 40, it should be understood that they may be mounted in or on the housing and in spaced relation relative to the reflective substrate. Still further, and as should be appreciated, while the electromagnetic radiation emitters 60 (LEDs) are shown, in the present form of the invention, mounted on the reflective layer 50, in the event that the reflective substrate or mirror 40 which is mounted on the housing 21 has a reflective layer positioned on the first surface 41, then under those circumstances, the electromagnetic radiation emitters 60 could be mounted on the second or inwardly facing surface 45 of the light transmissible substrate 43. As seen in FIG. 7, the plurality of electromagnetic radiation emitters 60 are each mounted in approximately the same orientation relative to the second surface 42 of the reflective substrate 40. It will be understood, however, that while FIG. 7 shows the respective electromagnetic radiation emitters (LEDs) positioned in approximately the same orientation, it is possible to mount the respective electromagnetic radiation emitters 60 in different orientations relative to the second surface 42 to achieve other assorted benefits. The plurality of electromagnetic radiation emitters 60 may be affixed to the second surface 42 of the reflective substrate 40 by means of adhesives and other fastening techniques. Still further, the respective electromagnetic radiation emitters may be electrically coupled to the controls of the overland vehicle 11 by way of discrete electrical wires which may be formed into a so-called "pig-tail"; or further, may be electrically coupled to the controls by way of electrical tracings which are made integral with the reflective substrate 40. Such electrical tracings may be applied by various silk screening techniques and the like. Still further, it is possible that these same electromagnetic radiation emitters may be coupled to the controls of the overland vehicle by way of electrical conductors incorporated into another structure, such as a heater which is made integral with the reflective substrate 40. Such structures are described in more detail with respect to U.S. patent application Ser. No. 10/355,915 and which was filed in the USPTO on Jan. 28, 2003. The teachings of this patent application are further incorporated by reference herein. In addition to the foregoing, the respective electromagnetic radiation emitters 60 may be mounted on a separate circuit board (not shown) and which may be immediately juxtaposed relative to the second surface 42. This circuit board may be of a rigid design, or one that is fabricated of a more flexible substrate. In this arrangement, the circuit board (not shown) would have discrete apertures formed therein (if the circuit board was substantially opaque) and which would be substantially coaxially aligned relative to the respective apertures 51 or region(s) of reflective coating 50 which is of reduced thickness which is formed in the reflective layer 50. In any event, and regardless of the nature of how the respective electromagnetic radiation emitters 60 are mounted, the respective electromagnetic radiation emitters 60 each face away from the second surface 42 and in the direction of the cavity 35. This is most clearly seen in FIG. 7. The plurality of electromagnetic radiation emitters may emit visibly discernable electromagnetic radiation 61 having approximately the same wavelength and thus color, or further, may have different colors when energized depending upon the needs of the end user. Moreover, a plurality of LEDs 60 may be clustered together in pixel-like arrangements and then selectively energized to various degrees to produce light of various colors for any end use desired. Such could be achieved, for instance, by forming pixels formed of LED's which emit red, green and blue light.

As seen in FIG. 7, the signaling assembly 10 of the present invention includes a reflector 70 which is borne by the second surface 42 of the reflective substrate 40 and which directs the electromagnetic radiation 61 emitted by some of the electromagnetic radiation emitters in a direction so that it may pass through the reflective substrate 40 and be viewed from a location forward of the first surface 41, and the electromagnetic radiation 61 emitted by the remainder of the electromagnetic radiation emitters 60 in a direction so that they may be viewed from a location forward of the second surface 42. In this regard, the reflector 70 has a first portion 71 which is disposed in substantially eccentric reflecting relation relative to some of the electromagnetic radiation emitters 60 and the aperture 51. As seen in FIG. 7, the first portion 71 of the reflector 70 directs the electromagnetic radiation 61 emitted by some of the electromagnetic radiation emitters 60 through the aperture 51 so that it may be viewed from a location 74 forward of the first surface 41. This is seen most clearly by reference to FIG. 5. As seen in FIG. 7, the electromagnetic radiation emitters 60 are positioned in laterally offset relation relative to the aperture 51. Still further, the individual first and second portions of the reflectors 70 have individual axes or lines of orientation generally indicated by the line labeled 73. As will be appreciated from a study of the drawing, the first portion 71 of the reflector 70 is oriented or otherwise positioned in eccentric reflecting relation relative to at least one of the plurality of electromagnetic radiation emitters 60. As such, the first portion 71 of the reflector is operable to direct emitted electromagnetic radiation 61 provided by some of the electromagnetic radiation emitters 60 through the aperture 51 such that it may be seen from a first position 74 (FIGS. 1 and 5) which is located in front or forward of the first surface 41 of the reflective substrate 40. When the invention 10 is mounted on an overland vehicle, the emitted electromagnetic radiation 61 can be seen from a location laterally and to the rear thereof.

Figure 1:
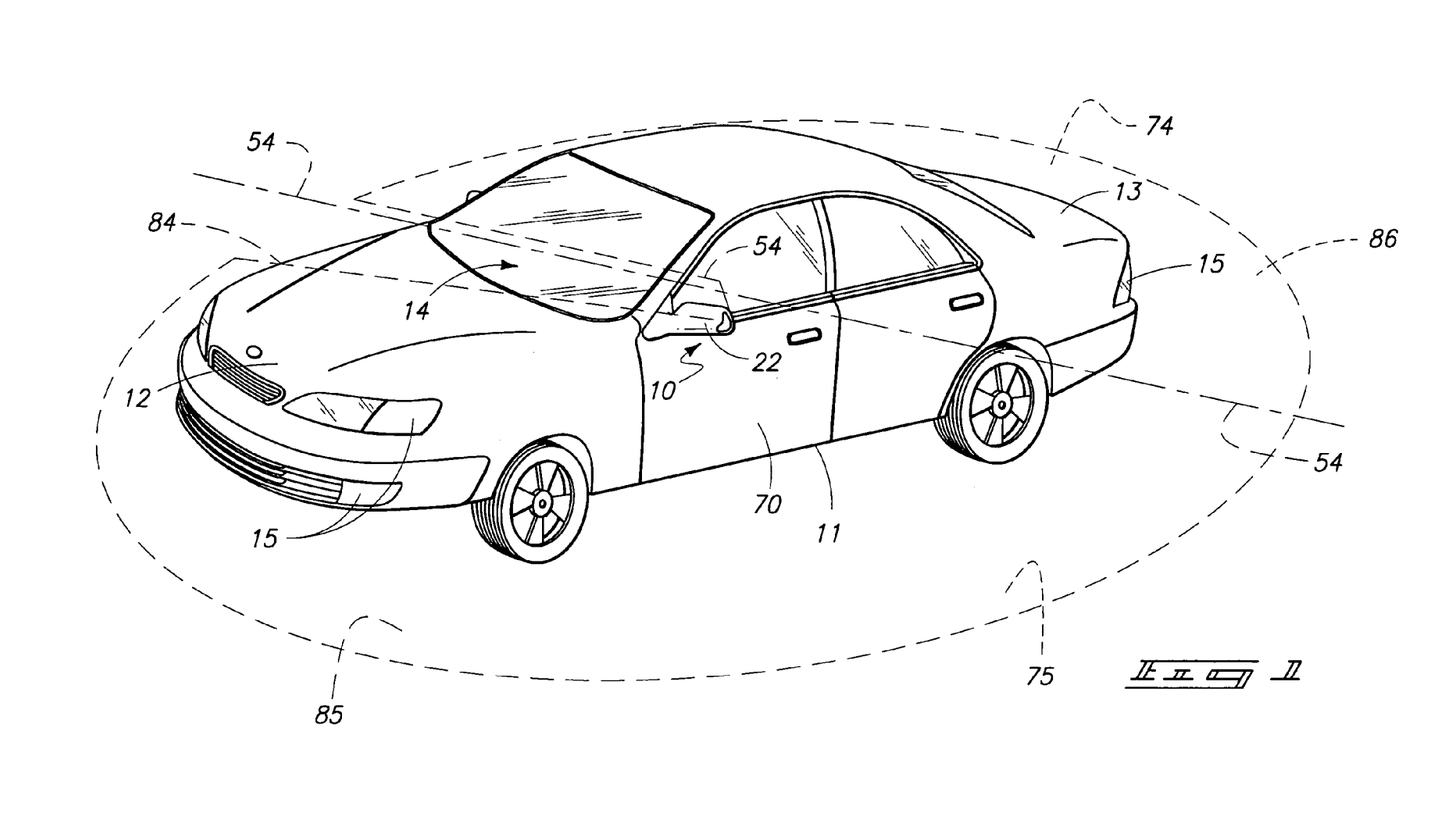
FIG. 1 is a perspective view of an overland vehicle which employs the signaling assembly of the present invention.
Figure 2:
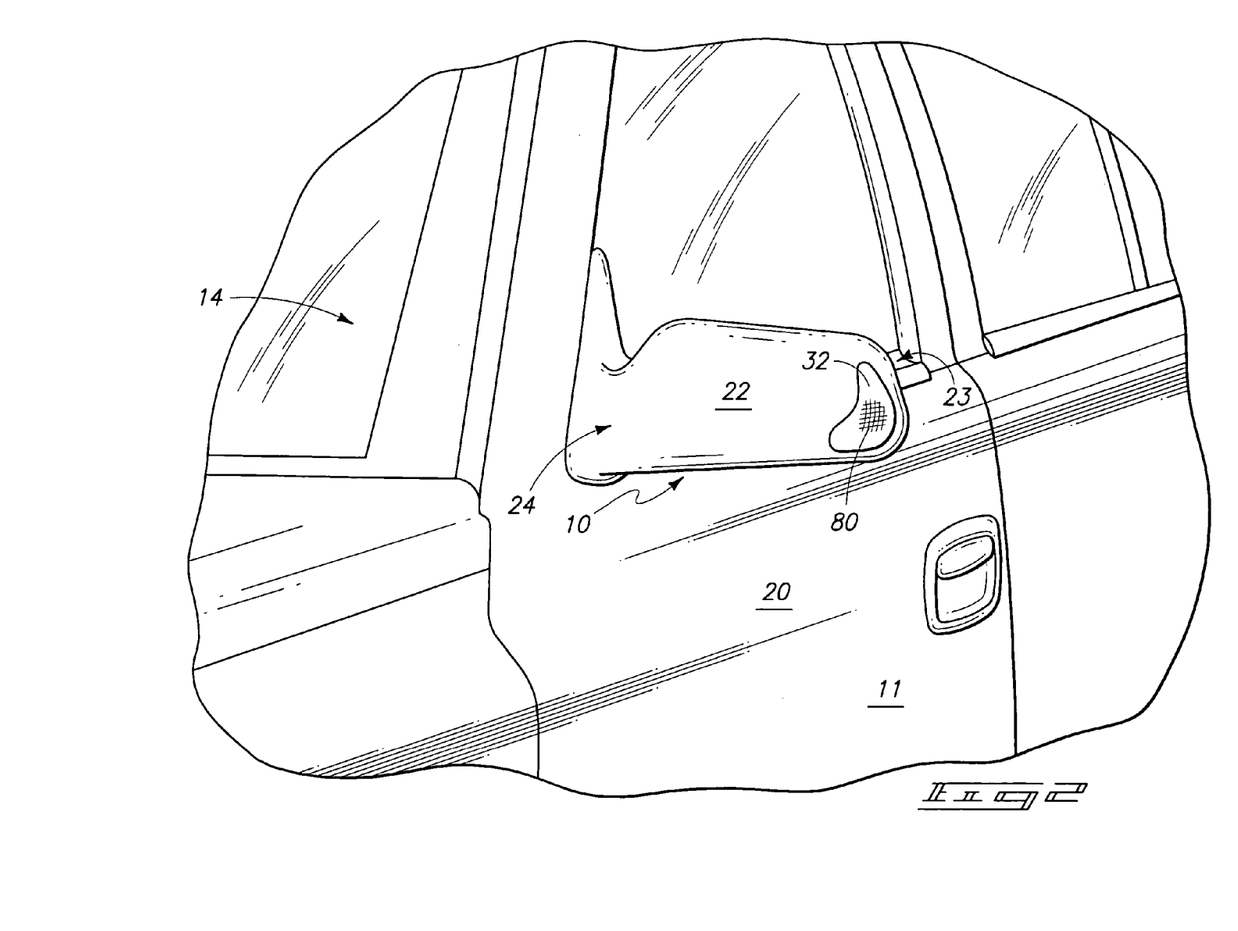
FIG. 2 is a perspective, somewhat enlarged view of the signaling assembly of the present invention and which is appropriately mounted on an overland vehicle.

As illustrated in FIG. 7, the second portion 72 of the reflector 70 is operable to direct emitted electromagnetic radiation 61 originating from some of the electromagnetic radiation emitters 60 in a direction such that it may be viewed from a second position 75 which is forward of and laterally disposed relative to the second surface 42 of the reflective substrate 40 (FIGS. 1, 5 and 7). As will be appreciated, the emitted electromagnetic radiation 61 which is directed forward of the second surface 42 is directed by way of the second portion 72 of the reflector 70 through the aperture 32 which is defined by the sidewall 22 of the housing 21. As seen in FIG. 7, the first and second portions 71 and 72 are made integral with one another to form a substantially unitary reflecting body. However, it is possible that the first and second portions may be positioned in predetermined spaced relation one to the other. The respective portions of the reflector 70 may be fabricated in various shapes in order to provide a reflection of the electromagnetic radiation 61 in the desired direction for the particular automotive platform application on which the signaling assembly 10 is mounted. As seen in FIG. 7, the lines of orientation or axes 73 of the first and second portions 71 and 72 are disposed in substantially parallel spaced relation one relative to the other. It is possible however to fabricate a reflector 70 where the respective axes of orientation 73 are oriented in a nonparallel relationship. In any event, the reflector 70 is operable to reflect the emitted electromagnetic radiation 61 such that a portion of the emitted electromagnetic radiation is transmitted in a first direction, and another portion of the emitted electromagnetic radiation is transmitted in a diverging, opposite or different, second direction (FIG. 5).

As best seen by reference to FIG. 4, a translucent substrate 80 is provided and which is operable to substantially occlude the second aperture 32 which is defined by the sidewall 22 of the housing 21. As also seen in FIG. 4, a gasket 81 is provided and which prevents rain, snow, dust, etc. from entering the cavity 35. In some forms of the invention, this gasket may be eliminated. As will be recognized from a study of the drawings (FIG. 1), the translucent substrate 80 permits visibly discernable electromagnetic radiation 61, and more specifically that electromagnetic radiation emitted by a portion of the electromagnetic radiation emitters 60 and which is reflected or directed by the second portion 72 of the reflector 70, to pass therethrough, and be viewed from the second position 75 which is forward of the second surface 42. The translucent substrate 80 is fabricated by utilizing conventional manufacturing techniques. As seen in the drawings (FIGS. 3 and 4), the translucent substrate 80 may include a plurality of lenses 83 which are made integral with the translucent substrate, and which provides a means for effectively dispersing or directing the visibly discernable electromagnetic radiation 61 in a wide pattern. As will be seen by reference to FIG. 1, sidewall 22 of the mirror housing 20 and which defines the second aperture 32 (FIG. 4), defines a second line of reference 84. Relative to this line of reference 84, the visibly discernable electromagnetic radiation 61 which is directed outwardly by way of the second portion 72 of the reflector 70 can be seen or otherwise forms a first zone of light 85 which can be viewed from a location laterally and forwardly of the overland vehicle 11. As seen in FIG. 1, relative to the line of reference 54, the visibly discernable electromagnetic radiation 61 which is reflected or otherwise directed by the first portion of the reflector 70, forms a second zone of light 86 which can be viewed from a location laterally and rearwardly of the vehicle 11 such as from the first position 74. This second zone of light 86 lies within, and less than about 180° relative to the line of reference 54. Still further, the first zone of light 85 which is transmitted and passes through the translucent substrate 80 may be substantially visibly discerned from locations laterally and forwardly disposed relative to the overland vehicle 11 and greater than about 180° relative to the line of reference 54. These respective zones of light 85 and 86 form discrete visibly discernable signals. As can be seen by reference to the drawings, the electromagnetic radiation 61 provided by the apparatus 10 is therefore substantially visible from assorted positions which are located at less than about 300° relative to the line of reference 54. As will be recognized, these first and second visibly discernable signals or respective zones of light 85 and 86 are normally illuminated substantially simultaneously although it is possible, based upon the design of the signaling assembly, that the first and second signals may be illuminated in an alternative manner, or in any given sequence which is desired.

Figure 8:
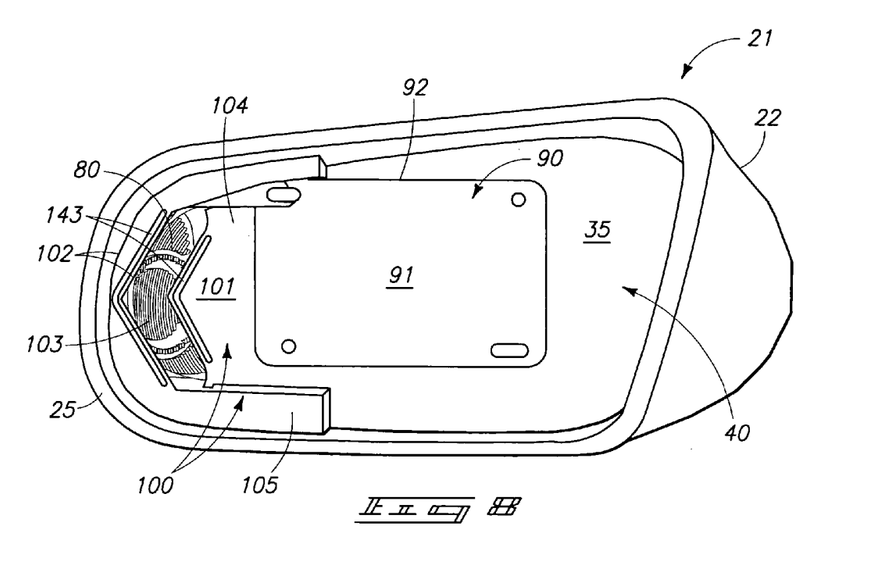
FIG. 8 is a fragmentary, perspective, side elevation view of one form of the signaling assembly of the present invention with some assemblies removed to show the structure thereunder.
Figure 9:
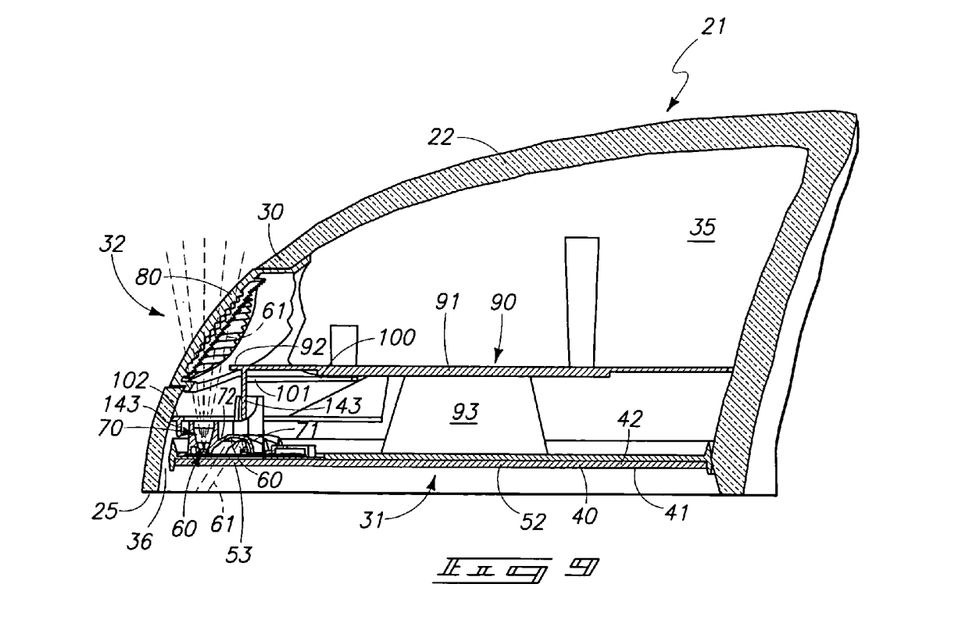
FIG. 9 is a fragmentary, transverse, vertical sectional view of a second form of the invention as shown in FIG. 6 and which is taken from a position along line 7—7.

Referring now to FIGS. 8 and 9, another form of the present invention is seen with some assemblies removed in order to show the structure thereunder. The form of the invention as seen in FIG. 8 illustrates an alternative arrangement to that seen in FIG. 7. Referring now to FIG. 8, it will be seen that a motor mount 90 of conventional design is mounted within the cavity 35 as defined by the mirror housing 21. The motor mount 90 is attached in a fixed location within the mirror housing 21 by conventional means and includes a main body 91 which is defined by a peripheral edge 92. As seen in the sectional view of FIG. 9, a motor 93 of conventional design is affixed to the motor mount and is operable to be controlled remotely from the overland vehicle 11 in order to position the reflective substrate 40 in various angular orientations relative to the overland vehicle 11 such that an operator of same can view areas of interest which are rearwardly and laterally disposed relative to the overland vehicle 11 while it is being operated. Referring still to FIGS. 8 and 9, it will be seen that the present form of the invention includes a light channeling assembly which is generally indicated by the numeral 100, and which is positioned near the electromagnetic radiation emitters 60, and which directs the visibly discernible electromagnetic radiation 61 in a direction where it may be viewed from a location which is forward of one of the first and/or second surfaces 41 and/or 42 of the reflective substrate 40. As clearly understood by a study of FIGS. 7, 8 and 9, the light channeling assembly is so arranged and positioned that it substantially prohibits the passage of any emitted visibly discernible electromagnetic radiation 61 through the gap 36 which is defined between the reflective substrate 40 and the adjacent mirror housing 21.

The light channeling assembly 100 has a main body 101 (FIG. 8) which is defined by a peripheral edge 102. A portion of the peripheral edge being located adjacent to the sidewall 22 which defines the second aperture 31. This is seen most clearly by reference to FIG. 9. The main body 101 defines an aperture 103 which permits the passage of visibly discernible electromagnetic radiation 61 therethrough so it may pass out through the second aperture 32 which is defined by the sidewall 22. As can be seen by a study of FIG. 8, in order to make the light channeling assembly integral with the motor mount or housing and still achieve effective light channeling, the light channeling assembly 100 has a first portion 104 which is located at a first distance from the reflective substrate 40, and a second portion 105, which is located at a second distance from the reflective substrate, and wherein the first distance is greater than the second distance. These two distances may be uniform throughout the housing or may be different. Still further, additional baffles 143 are made integral with the light channeling assembly as shown. The first form of the light channeling assembly 100 typically may be fabricated from a thermal moldable substrate which would be suitable for the operational and environmental conditions as described herein. Although, other rigid substrates could potentially be substituted for same. Additionally, the light channeling assembly may be fabricated from a flexible, inexpensive, lightweight material such as a synthetic foam or the like.

Second Form

Figure 10:
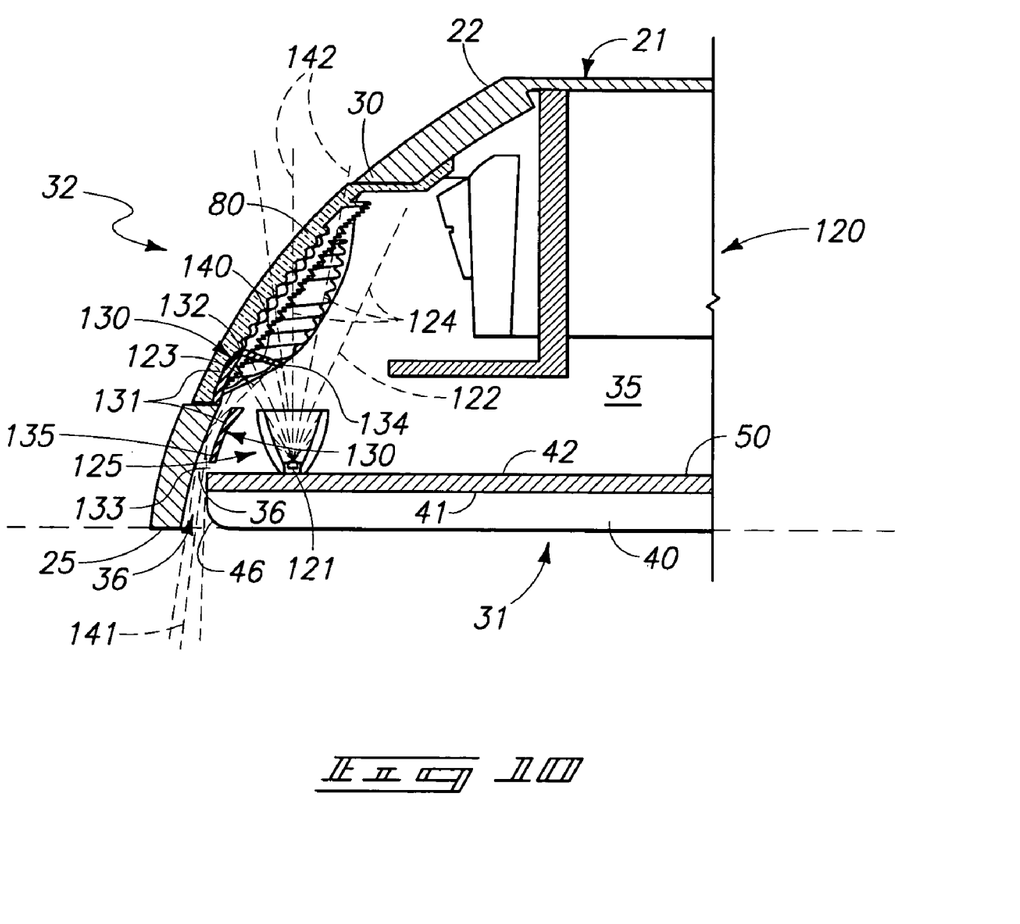
FIG. 10 is a fragmentary, transverse, vertical sectional view of yet another form of a signaling assembly of the present invention.

The second form of the invention is generally indicated by the numeral 120 in FIG. 10, and is shown in a fragmentary, substantially vertical sectional view. As compared to previous Figures, like numbers describe identical structures in FIG. 10. As seen in FIG. 10, and in the second form of the invention 120, a signaling assembly is illustrated, and which uses a plurality of light emitting diodes 121 which are of similar design to that which was earlier described at 60. In similar fashion, these LED's are further affixed on the second surface 42 of the reflective substrate 40. In the second form of the invention, the light emitting diodes 121 are energized by the electrical coupling arrangement previously disclosed with respect to the first form of the invention and are also operable, when energized, to emit visibly discernible electromagnetic radiation 122 which has a first portion 123, and a second portion 124. In the arrangement as seen in FIG. 10, the first portion of the emitted electromagnetic radiation is operable to pass through the gap 36 so that it may be viewed from a location forward of the first surface 41, and the second portion 124 of the visibly discernable electromagnetic radiation passes through the translucent substrate 80 so that it may be viewed from a location forward of the second surface 42. As illustrated in FIG. 10, a reflector 125 is provided, and which is disposed in substantially concentric reflecting relation thereabout the electromagnetic radiation emitter or LED 121 and which is borne by the reflective substrate 40. As should be understood, various reflectors of assorted designs could be utilized in the place of same, and which may not, necessarily, be oriented in substantially concentric reflecting relation relative to the respective LED's. These other reflectors would be selected to achieve any desired illumination or radiation pattern.

As further seen in FIG. 10, a light channeling assembly which is generally indicated by the numeral 130 is positioned near the electromagnetic radiation emitter 121 and which is operable to direct emitted visibly discernible electromagnetic radiation 122 in a direction where it may be viewed from a location which is forward of one of the first and/or second surfaces 41 and 42 of the reflective substrate 40 (zones 85 and 86). The signaling assembly 120 as seen in FIG. 10 is operable to produce visibly discernible signals which can be viewed from substantially opposite locations zones 85 and 86 (FIG. 1) relative to the housing 21. In the arrangement as seen in FIG. 10, the light channeling assembly 130 has a main body 131 which defines a sidewall 132. The light channeling assembly and more specifically the sidewall thereof has a first end 133 which is positioned adjacent to the second surface 42 of the reflective substrate 40, and a second end 134 which is located in spaced relation relative to the second surface of the reflective substrate. The sidewall 132 in combination with the sidewall 22 of the housing 21 defines a passageway 135. Still further, and as seen in FIG. 10, a primary reflective surface 140 is formed at the second end 134 and is operable to reflect the first portion 123 of the visibly discernible electromagnetic radiation 122 along the passageway 135 and through the gap 36 to form a first visibly discernible electromagnetic radiation signal 141 as illustrated. Yet further, the second portion 124 of the visibly discernible electromagnetic radiation 122 forms a second visibly discernible electromagnetic radiation signal 142. These individual visibly discernable signals operate in substantially identical fashion to that earlier disclosed with respect to the first form of the invention. As will be recognized however, the first visibly discernible signal 141 does not pass or otherwise travel through the reflective substrate 40, but rather passes through the gap 36 which is defined between the reflective substrate 40 and the adjacent sidewall 22 of the mirror housing 21.

Operation

The operation of the described forms of the present invention are believed to be readily apparent and are briefly summarized at this point. As best seen by reference to the drawings, a signaling assembly of the present invention includes a housing having a sidewall 22 and which defines an internal cavity 35, and first and second apertures 31 and 32. A reflective substrate 40 having a peripheral edge 46 is disposed in partially occluding relation relative to the first aperture. An electromagnetic radiation emitter 60 is borne by the reflective substrate 40 and emits visibly discernible electromagnetic radiation 61, 122 into the cavity. In one form of the invention, a first portion of the visibly discernible electromagnetic radiation 123 passes around the peripheral edge 46 the reflective substrate and forms a first visibly discernible signal 141 which can be seen from a first position 86 (FIG. 1), and a second portion of the visibly discernible electromagnetic radiation 124 passes through the second aperture and forms a second visibly discernible signal 142 which can be seen from a second location 85. The first and second locations are angularly displaced one relative to the other by greater than about 90 degrees.

As earlier discussed, one form of the signaling assembly of the present invention includes a mirror housing 21 having a sidewall 22 and which defines an internal cavity 35 and first and second apertures 31 and 32. A reflective substrate 40 having a peripheral edge 46 is provided, and which is disposed in partially occluding relation relative to first aperture 31. An electromagnetic radiation emitter 60 is borne by the reflective substrate and located within the internal cavity 35 of the housing 21, and which, when energized, emits visibly discernible electromagnetic radiation 61 which passes through the second aperture 32, and which can be visibly discerned from a location at a distance from the mirror housing 21. Still further, in this form of the invention, a light channeling assembly 100 is positioned in the internal cavity and adjacent to the electromagnetic radiation emitter 60, and which directs visibly discernible electromagnetic radiation through the second aperture 32 and which further substantially impedes emitted visibly discernible electromagnetic radiation from passing around the peripheral edge 46 of the reflective substrate 40. In this form of the invention, the light channeling assembly 100 includes a main body 101 which is positioned therebetween the reflective substrate 40 and the second aperture 32 which is defined by the mirror housing 21.

Therefore it will be seen that the signaling assembly of the present invention provides assorted advantages and addresses many of the shortcomings of the prior art devices or assemblies which have been utilized heretofore. Yet further, the present signaling assembly achieves additional benefits by providing a visible visual signal which can be seen through a wide range of locations relative to the overland vehicle 11 and which has not been possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A signaling assembly, comprising:
    a reflective substrate having opposite first and second surfaces;
    a housing defining an internal cavity, and further defining first and second apertures, and wherein the reflective substrate partially occludes the first aperture, and wherein the second surface of the reflective substrate is received within the cavity;
    a translucent substrate positioned in substantially occluding relation relative to the second aperture;
    an electromagnetic radiation emitter for emitting visibly discernible electromagnetic radiation and which is borne by the second surface of the reflective substrate; and
    a light channeling assembly positioned near the electromagnetic radiation emitter, and which directs the emitted visibly discernible electromagnetic radiation in a direction where the emitted visibly discernible electromagnetic radiation may be viewed from a location which is forward of one of the first and/or second surfaces of the reflective substrate.

2. A signaling assembly, comprising:
a housing having a sidewall defining an internal cavity and first and second apertures;
a reflective substrate having a peripheral edge, and which is disposed in substantially occluding relation relative to first aperture; and
an electromagnetic radiation emitter borne by the reflective substrate and emitting visibly discernible electromagnetic radiation into the cavity, and wherein a first portion of the visibly discernible electromagnetic radiation passes around the peripheral edge of the reflective substrate and forms a first visibly discernible signal which can be seen from a first position, and a second portion of the visibly discernible electromagnetic radiation passes through the second aperture and forms a second visibly discernible signal which can be seen from a second location, and wherein the first and second locations are angularly displaced one relative to the other by greater than about 90 degrees.

3. The signaling assembly as claimed in claim 1, and wherein a gap is defined between the reflective substrate, and the housing, and wherein the light channeling assembly directs a first portion of the emitted visibly discernible electromagnetic radiation through the gap so that the emitted visibly discernible electromagnetic radiation may be viewed from a location forward of the first surface, and a second portion of the visibly discernible electromagnetic radiation through the translucent substrate so that the emitted visibly discernible electromagnetic radiation may be viewed from a location forward of the second surface.

4. The signaling assembly as claimed in claim 1, and wherein a gap is defined between the reflective substrate, and the housing, and wherein the light channeling assembly directs a portion of the emitted visibly discernible electromagnetic radiation through the translucent substrate so that the emitted visibly discernible electromagnetic radiation may be viewed from a location forward of the second surface, and which further substantially inhibits the passage of emitted visibly discernible electromagnetic radiation through the gap.

5. A signaling assembly comprising:
a housing defining an internal cavity, and further defining first an second apertures;
a reflective substrate having opposite first and second surfaces, and wherein the reflective substrate partially occludes the first aperture, and wherein a gap is defined between the reflective substrate and the housing;
a translucent substrate positioned in substantially occluding relation relative to the second aperture;
a plurality of electromagnetic radiation emitters borne by the second surface of the reflective substrate, and wherein the reflective substrate simultaneously reflects and passes visibly discernible electromagnetic radiation;
a reflector having first and second portions, and wherein the first and second portions are disposed in reflecting relation relative to at least one of the plurality of electromagnetic radiation emitters, and wherein the first portion of the reflector reflects electromagnetic radiation emitted by one of the plurality of electromagnetic radiation emitters in a first direction so that the electromagnetic radiation may pass through the reflective substrate, and be seen from a first position, and the second portion of the reflector reflects electromagnetic radiation emitted by one of the plurality of electromagnetic radiation emitters in a second direction so that the electromagnetic radiation may be viewed from a second position which is substantially opposite to the first position; and
a light channeling assembly positioned near the plurality of electromagnetic radiation emitters and which directs a portion of the emitted visibly discernible electromagnetic radiation through the translucent substrate so that the emitted electromagnetic radiation may be viewed from a location forward of the second surface, and which further substantially inhibits the passage of visibly discernible electromagnetic radiation through the gap.

6. The signaling assembly as claimed in claim 5, and wherein the plurality of electromagnetic radiation emitters are each mounted in substantially the same orientation relative to the second surface of the of the reflective substrate.

7. The signaling assembly as claimed in claim 5, and wherein the plurality of electromagnetic radiation emitters are individually mounted in different orientations relative to the second surface of the reflective substrate.

8. The signaling assembly as claimed in claim 5, and wherein the first portion of the reflector is disposed in substantially eccentric reflecting relation relative to the at least one electromagnetic radiation emitter, and the second portion of the reflector is disposed in substantially concentric reflecting relation relative to the at least one electromagnetic radiation emitter.

9. The signaling assembly as claimed in claim 5, and wherein the reflective substrate has a reflective coating deposited thereon to a thickness which permits the passage of electromagnetic radiation therethrough.

10. The signaling assembly as claimed in claim 9, and wherein the reflective coating comprises chromium.

11. The signaling assembly as claimed in claim 9, and wherein the reflective coating comprises a dichroic coating.

12. A signaling assembly, comprising:
a housing having a sidewall which defines an internal cavity, and first and second apertures;
a reflective substrate having opposite, first and second surfaces, and a peripheral edge, and which further partially occludes the first aperture that is defined by the housing, and wherein a gap is defined between the reflective substrate and the sidewall;
a translucent substrate disposed in substantially occluding relation relative to the second aperture;
an electromagnetic radiation emitter mounted on the second surface of the reflective substrate and which, when energized, emits visibly discernible electromagnetic radiation having first and second portions, and wherein the second portion of the visibly discernible electromagnetic radiation passes through the translucent substrate; and
a light channeling assembly disposed, at least in part, against the sidewall of the housing, and which reflects the first portion of the visibly discernible electromagnetic radiation through the gap which is defined between the sidewall and the reflective substrate.

13. The signaling assembly as claimed in claim 12, and wherein the first and second portions of the visibly discernible electromagnetic radiation form visibly discrete visual signals which can be viewed from substantially opposite locations relative to the housing.

14. The signaling assembly as claimed in claim 13, and wherein the light channeling assembly includes a sidewall which defines a passageway, and which has opposite first and second ends, and wherein the gap defined between the reflective substrate and the sidewall of the housing has a width dimension, and wherein the first end of the passageway has a cross sectional dimension which is less that width dimension of the gap.

15. The signaling assembly as claimed in claim 14, and wherein the sidewall of the housing defines, in part the passageway, and wherein the first end of the light channeling assembly is positioned adjacent to the second surface of the reflective substrate, and the second end of the light channeling assembly is located in spaced relation relative to the second surface of the reflective substrate.

16. The signaling assembly as claimed in claim 15, and wherein the second end of the passageway defines a primary reflecting surface which reflects the first portion of the visibly discernible electromagnetic radiation along the passageway and through the gap to form a visibly discernible signal.

17. A signaling assembly, comprising:
a mirror housing having a sidewall defining an internal cavity and first and second apertures;
a reflective substrate having a peripheral edge, and which is disposed in partially occluding relation relative to the first aperture;
an electromagnetic radiation emitter borne by the reflective substrate, and located within the internal cavity of the housing, and which, when energized, emits visibly discernible electromagnetic radiation which passes through the second aperture and which can be visibly discerned from a location at a distance from the mirror housing;
a light channeling assembly positioned in the internal cavity and adjacent to the electromagnetic radiation emitter and which directs visibly discernible electromagnetic radiation through the second aperture and which further substantially impedes emitted visibly discernible electromagnetic radiation from passing around the peripheral edge of the mirror; and
a motor mount positioned in the internal cavity, and wherein the light channeling assembly is made integral with the motor mount or mirror housing.

18. The signaling assembly as claimed in claim 17, and wherein the light channeling assembly has a main body defined by a peripheral edge, and wherein a portion of the peripheral edge of the main body is positioned adjacent to the sidewall of the mirror housing.

19. The signaling assembly as claimed in claim 18, and wherein the main body of the light channeling assembly defines an aperture through which the visibly discernible electromagnetic radiation passes, and wherein the main body of the light channeling assembly is positioned therebetween the reflective substrate and the second aperture which is defined by sidewall of the mirror housing.

20. The signaling assembly as claimed in claim 19, and wherein the peripheral edge of the light channeling assembly has a first portion which is located at a first distance from the reflective substrate, and a second portion which is located at a second distance from the reflective substrate, and wherein the first distance is greater than the second distance.

21. The signaling assembly as claimed in claim 19, and wherein the electromagnetic radiation emitter includes a plurality of electromagnetic radiation emitters borne by the reflective substrate and which are located within the internal cavity of the housing, and wherein the reflective substrate simultaneously reflects and passes visibly discernible electromagnetic radiation; and wherein the signaling assembly further comprises a reflector having first and second portions, and wherein the first and second portions are disposed in reflecting relation relative to at least one of the plurality of electromagnetic radiation emitters, and wherein the first portion of the reflector reflects electromagnetic radiation emitted by one of the plurality of electromagnetic radiation emitters in a first direction so that the electromagnetic radiation may pass through the reflective substrate, and be seen from a first position, and the second portion of the reflector reflects electromagnetic radiation by at least one of the plurality of electromagnetic radiation emitters in a second direction so that the electromagnetic radiation may be viewed from a second position which is substantially opposite to the first position.

22. The signaling assembly as claimed in claim 21, and wherein the plurality of electromagnetic radiation emitters are each mounted in substantially the same orientation relative to the reflective substrate.

23. The signaling assembly as claimed in claim 21, and wherein the plurality of electromagnetic radiation emitters are individually mounted in different orientations relative to the reflective substrate.

24. The signaling assembly as claimed in claim 21, and wherein the first portion of the reflector is disposed in substantially eccentric reflecting relation relative to the at least one electromagnetic radiation emitter, and the second portion of the reflector is disposed in substantially concentric reflecting relation to the at least one electromagnetic radiation emitter.

25. The signaling assembly as claimed in claim 21, and wherein the reflective substrate has a reflective coating deposited thereon which permits the passage of visibly discernible electromagnetic radiation therethrough.

26. The signaling assembly as claimed in claim 21, and wherein the reflective substrate has a first region which has a reflective coating deposited thereon and which substantially prevents the passage of visibly discernible electromagnetic radiation therethrough, and a second region, which is adjacent to the first region, and which is substantially devoid of any reflective coating and which permits the passage of visibly discernible electromagnetic radiation therethrough, and wherein the average reflectance of the reflective substrate including the first and second portions is greater than about 30%.

27. The signaling assembly as claimed in claim 25, and wherein the reflective coating comprises chromium.

28. The signaling assembly as claimed in claim 25, and wherein the reflective coating comprises a dichroic coating.

29. The signaling assembly as claimed in claim 17, and wherein the light channeling assembly is made of a lightweight, flexible material or a foam.

* * * * *